United States Patent [19]

Moravsky

[11] Patent Number: 5,056,855
[45] Date of Patent: Oct. 15, 1991

[54] VEHICLE BED COVER ASSEMBLY

[76] Inventor: Andrew Moravsky, 16948 Planchet Rd., Greenwell Springs, La. 70839

[21] Appl. No.: 565,671
[22] Filed: Aug. 10, 1990
[51] Int. Cl.⁵ .............................. B60P 7/02; B60P 3/34
[52] U.S. Cl. ..................................... 296/98; 296/37.6; 296/165; 296/100; 296/105; 296/106
[58] Field of Search .................. 296/98, 100, 102, 105, 296/106, 164, 165, 175, 37.6

[56] References Cited

U.S. PATENT DOCUMENTS

| | | | |
|---|---|---|---|
| 765,693 | 7/1904 | Wall | 296/138 |
| 1,067,660 | 7/1913 | Kay | 296/102 |
| 1,616,294 | 2/1927 | Yost et al. | 296/138 X |
| 1,897,946 | 2/1933 | Harvey | 296/138 |
| 2,479,036 | 8/1949 | Campbell | 296/102 |
| 2,670,988 | 3/1954 | Cook | 296/105 |
| 3,664,539 | 5/1972 | Shanhani | 296/100 X |
| 4,639,034 | 1/1987 | Amos | 296/105 X |
| 4,807,921 | 2/1989 | Champie, III et al. | 296/98 |

FOREIGN PATENT DOCUMENTS

| | | | |
|---|---|---|---|
| 953859 | 12/1956 | Fed. Rep. of Germany | 296/102 |
| 728051 | 4/1955 | United Kingdom | 296/105 |

*Primary Examiner*—Dennis H. Pedder

*Attorney, Agent, or Firm*—Robert C. Tucker; William David Kiesel

[57] ABSTRACT

A vehicle bed cover assembly is provided, comprising a primary frame member having an exterior side and an interior side, fixedly connectable between the sidewalls of a vehicle bed, the frame member extending to a desired height above the sidewalls; a roller assembly for anchoring and storing a top cover, mounted on the primary frame member; a flexible top cover having a first end and a second end, the first end being connected to the roller assembly; a first rail for partially supporting the bed cover assembly, fixedly connected to one sidewall; a second rail for partially supporting the bed assembly, fixedly connected to one sidewall opposite the first rail; at least one movable frame member, removably connectable to the first and second rails in a fixed position between the sidewalls of the vehicle bed and extending to a desired height above the sidewalls; a hook assembly for attaching the flexible top cover to the movable frame member, fixedly connected to the second end of the top cover and connectable to the movable frame member. Removable side panels and a tailgate assembly are attachable to the bed cover assembly.

20 Claims, 6 Drawing Sheets

VEHICLE BED COVER ASSEMBLY

BACKGROUND OF THE INVENTION

1. Field of the Invention

This invention relates generally to devices which cover open beds of vehicles, primarily trucks, and, more particularly, to vehicle bed covers which are removable.

2. Prior Art

Truck beds are usually constructed as open beds to allow for a variety of loads. However, it is often desirable to cover the load to protect it from weather, vandalism, etc. Also, in the case of pickup trucks, it is sometimes desirable to use the truck bed as a camper. Of course, permanent bed covers restrict vehicle use. Therefore, numerous designs have been attempted to provide a cover which is removable or which may be deployed only when desirable. Most prior art designs operate to cover the vehicle bed from the top of the sidewalls of the bed downward, utilizing the sidewalls as part of the cover. Many different designs, of which U.S. Pat. No. 4,807,921 is an example, accomplish this purpose.

When a removable cover is needed which rises above the sidewalls of the bed, hard camper shells have been used. While hard camper shells accomplish the objective of covering the bed, they are cumbersome and difficult to remove and must be stored away from the vehicle when not in use. Also, when a camper shell is installed on a truck bed, the entire load must fit within the confines of the camper shell. Partial covering of the bed is not possible. No bed cover is currently available which can be used to partially or fully cover a load extending above the sidewalls of the bed and which can be stored on the vehicle when not in use.

SUMMARY OF THE INVENTION

It is therefore an object of this invention to provide a vehicle bed cover assembly which can be used to partially or fully cover a load in a vehicle bed which extends above the sidewalls of the bed and which is stored on the vehicle when not in use.

It is another object of this invention to provide such a vehicle bed cover assembly which, when fully deployed, covers the sides and ends of a vehicle bed in an area above the sidewalls of the bed.

It is still another object of this invention to provide a vehicle cover assembly which occupies a minimum amount of space within the vehicle when stored.

It is a further object of this invention to provide a vehicle cover assembly which can be easily and quickly assembled and disassembled.

Accordingly, a vehicle bed cover assembly is provided, comprising a primary frame member fixedly connectable between the sidewalls of a vehicle bed, the frame member extending to a desired height above the sidewalls; a roller assembly for anchoring and storing a top cover, mounted on the primary frame member; a flexible top cover having a first end and a second end, the first end being connected to the roller assembly; a first rail for partially supporting the bed cover assembly, fixedly connected to one sidewall; a second rail for partially supporting the bed cover assembly, fixedly connected to one opposite the first rail; at least one movable frame member, removably connectable to the first and second rails in a fixed position between the sidewalls of the vehicle bed and extending to a desired height above the sidewalls; a hook assembly for attaching the flexible top cover to the movable frame member, fixedly connected to the second end of the top cover and removably connectable to the movable frame member.

Removable side panels and a tailgate assembly are attachable to the bed cover assembly. The entire assembly may be stored within the vehicle on the primary frame member.

DETAILED DESCRIPTION OF PREFERRED EMBODIMENTS OF THE INVENTION

Figure 1:
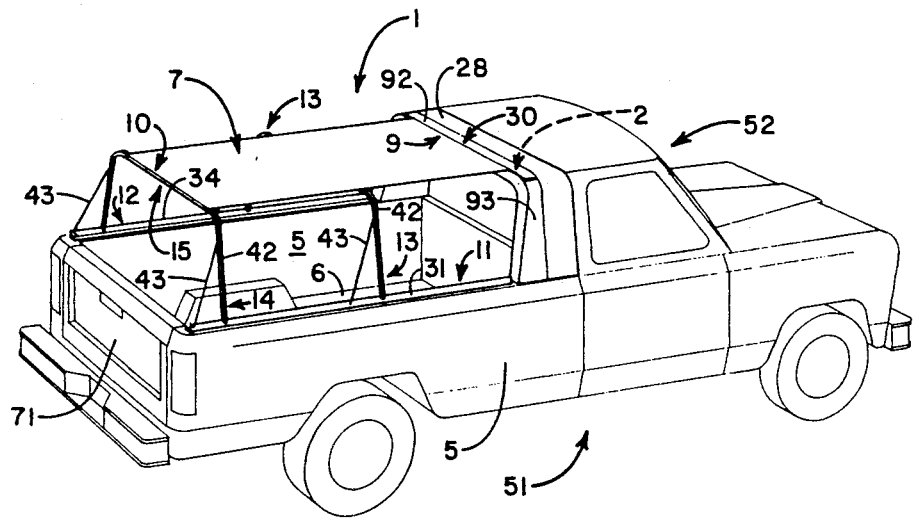
FIG. 1 is a perspective view of an embodiment of the invention in place on a truck bed.
Figure 2:
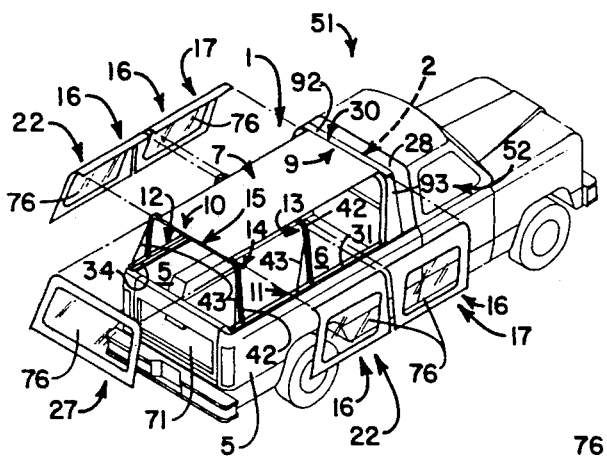
FIG. 2 is a perspective view of an alternate embodiment of the invention in place on a truck bed.
Figure 3:
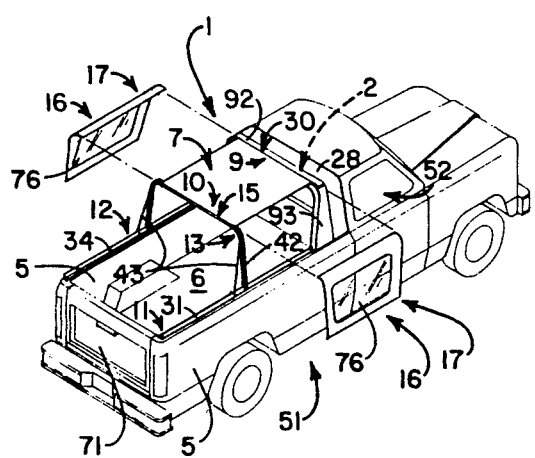
FIG. 3 is a perspective view of an alternate embodiment of the invention in place on a truck bed.

As shown generally in FIGS. 1-3, the vehicle bed cover assembly 1 generally comprises a primary frame member 2 (hidden in FIGS. 1-3 by outer shell 28 and inner shell 29), top cover 7, first movable frame member 13, second movable frame member 14, side panels 16, and tailgate assembly 27. When these components are in place, the bed cover assembly 1 closely resembles a hard camper shell, completely covering the vehicle bed 6 and supported by the bed sidewalls 5. The versatility of the invention 1 allows all or part of the components to be utilized in a variety of ways. When it is not desirable to cover bed 6, the invention 1 is easily stored within the vehicle 51 and on primary frame member 2.

As shown in FIG. 1, top cover 7 may be fully extended from primary frame member 2 and removably attached to first movable frame member 13 or second movable frame member 14 so as to fully cover bed 6 from the top while maintaining open sides. As shown in FIG. 2, forward side panels 17 and rear side panels 22 are removably attachable to the assembly 1 to fully cover the area between top cover 7 and the vehicle tailgate 71, if desirable. Tailgate assembly 27 is removably attachable to second movable frame member 14 in order to fully cover the rear, if desirable. FIG. 3 depicts a shortened embodiment wherein top cover 7 is removably attached to first movable frame member 13, partially covering bed 6 and allowing for open use of the remaining portion. Forward side panels 17 may be removably attached to cover the sides under top cover 7. If desirable in this embodiment, second movable frame member 14 may be substituted for first movable frame member 13, allowing tailgate assembly 27 to be used with the components shown in FIG. 3.

Figure 4:
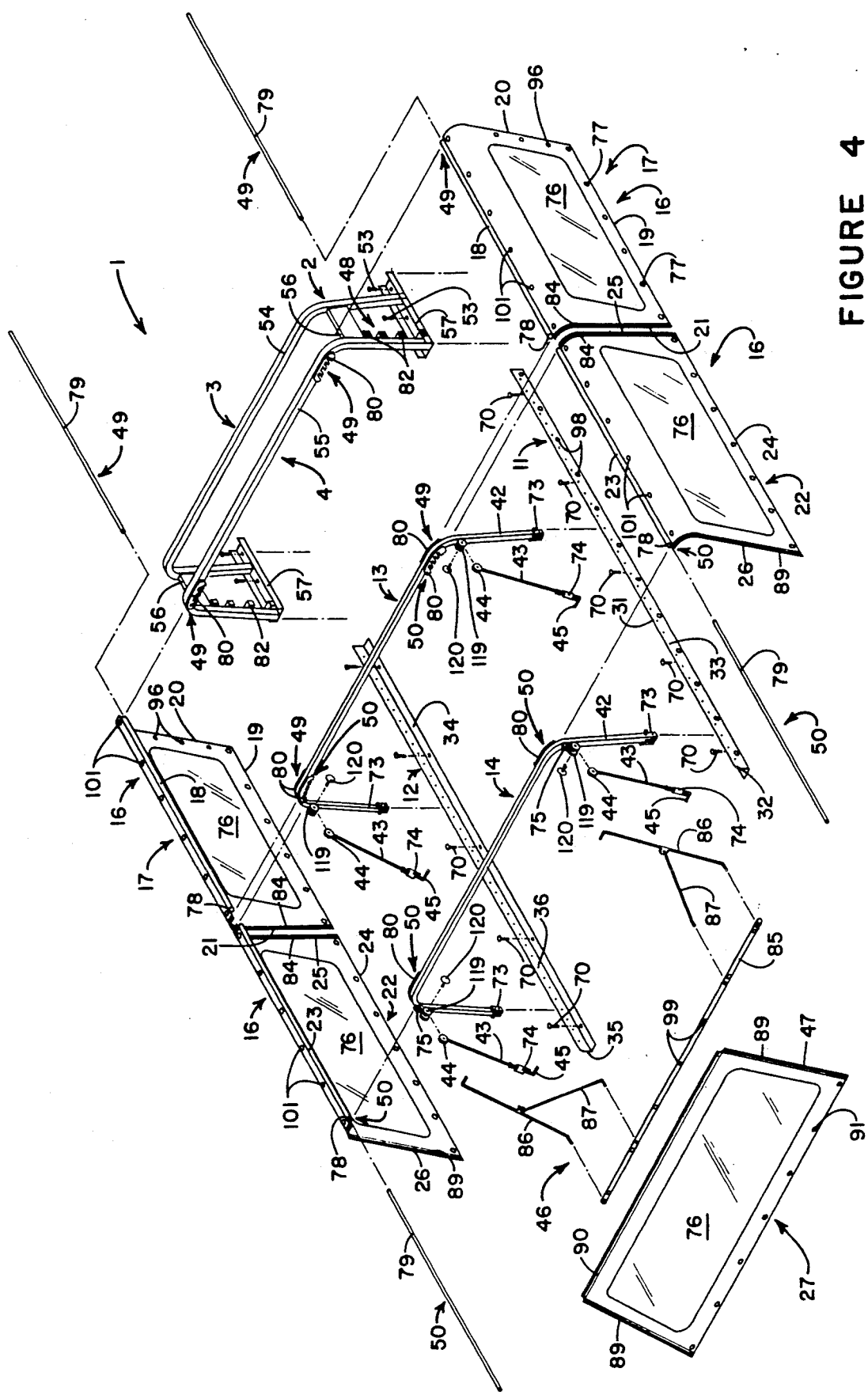
FIG. 4 is an exploded perspective view of some of the components of a preferred embodiment of the invention.
Figure 5:
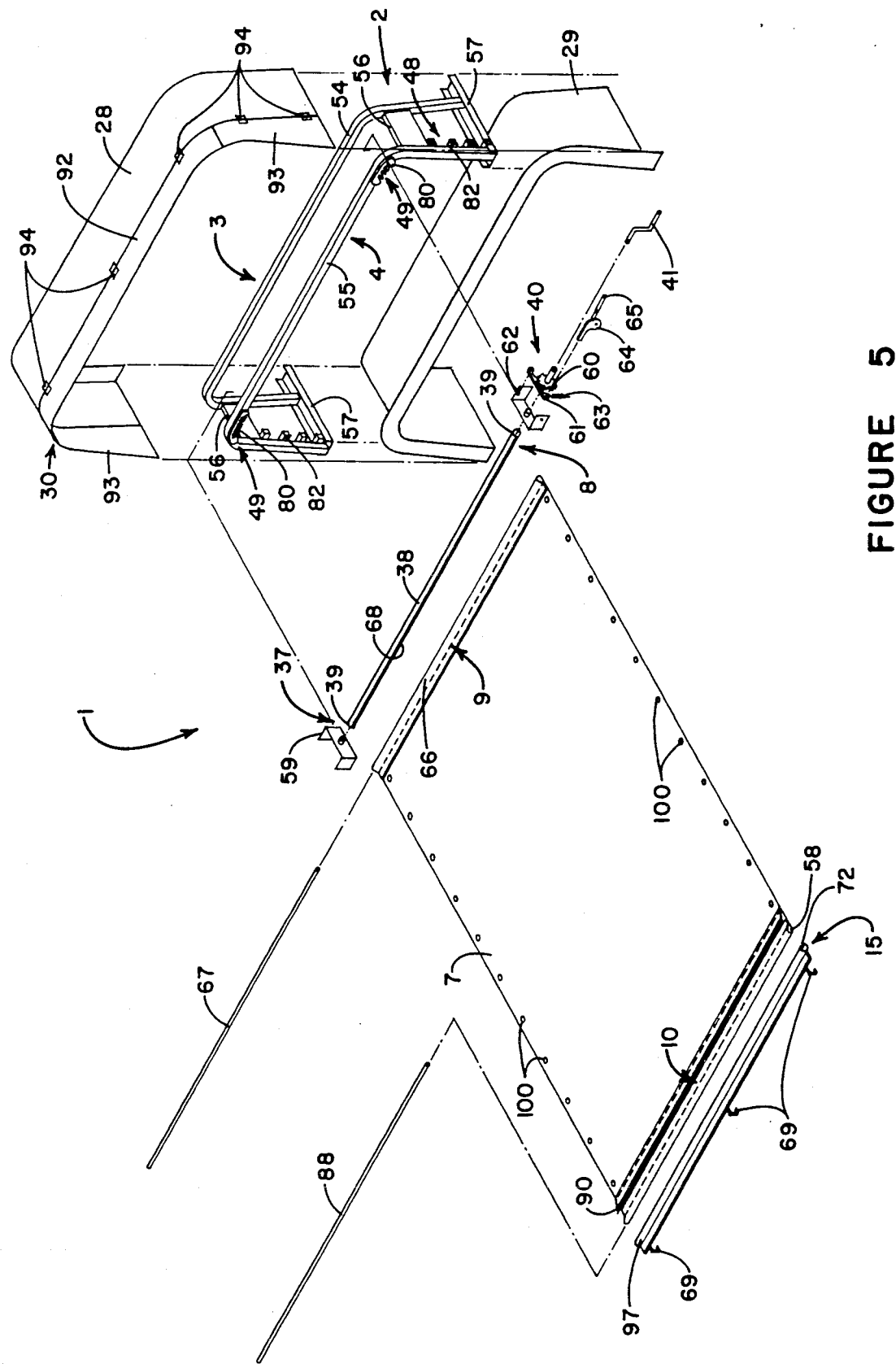
FIG. 5 is an exploded perspective view of some of the components of a preferred embodiment of the invention.
Figure 6:
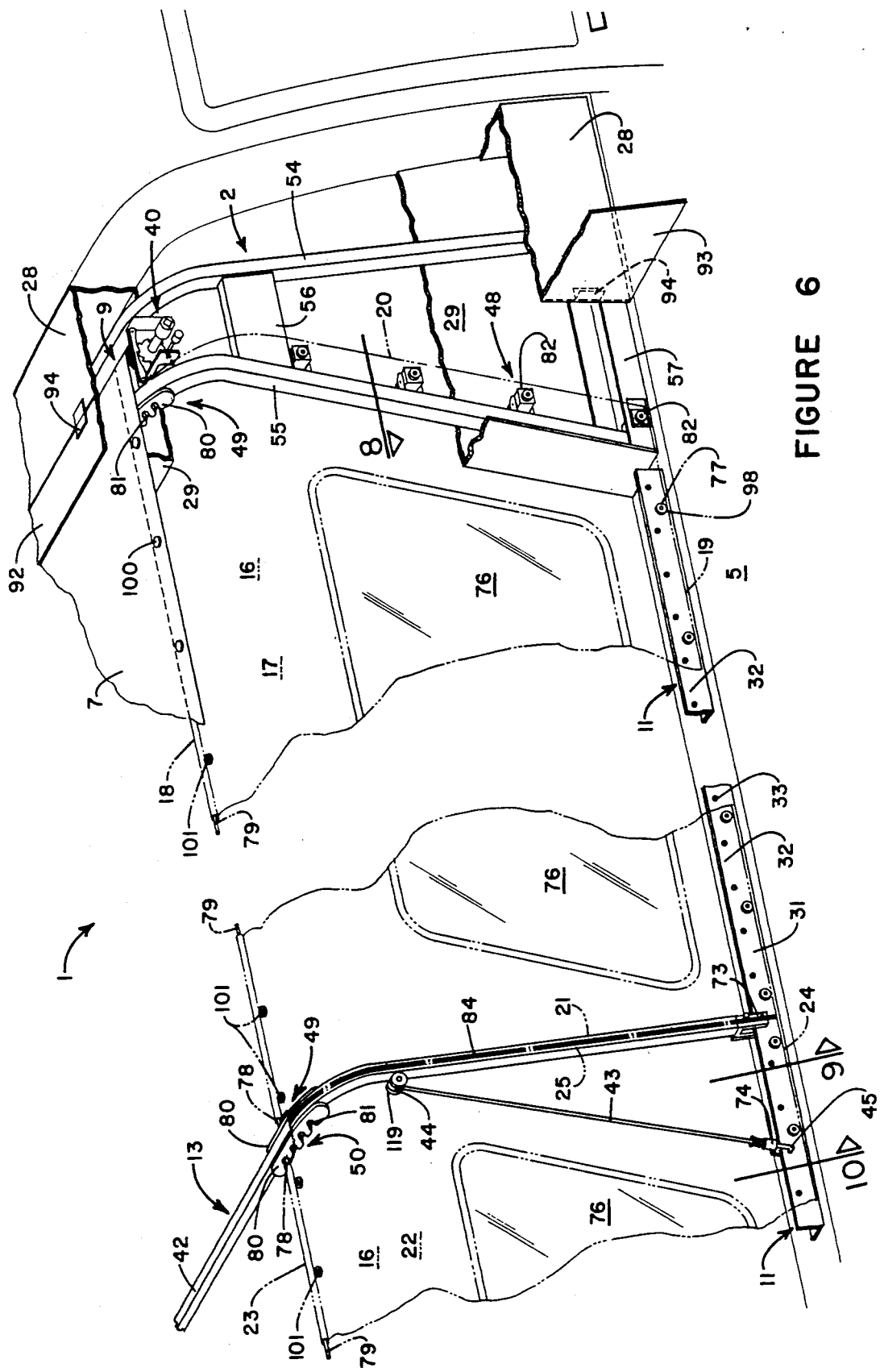
FIG. 6 is a perspective view of the connection details of a preferred embodiment of the invention.

FIGS. 4–10 show the invention 1 in greater detail. Primary frame member 2 extends above and is attached to sidewalls 5. Preferably, primary frame member 2 is permanently attached to sidewalls 5 by bolts 53, as shown in FIGS. 4–6. Primary frame member 2 is preferably an integral frame including a forward arch 54 and a rear arch 55, connected together by intermediate braces 56 and mounted on base plates 57, which are mounted on sidewalls 5. Primary frame member 2 is shaped so as to closely follow the contours of the truck cab 52. An outer shell 28 is attached to primary frame member 2 on its exterior side 3, and an inner shell 29 is attached to primary frame member 2 on its interior side 4.

When in place, outer shell 28 and inner shell 29 provide a smooth, aerodynamic extension of the shape of truck cab 52. Inner shell 29 also acts as a seal and water diverter, directing any rain water which may enter around or through outer shell 28 out and over sidewalls 5, keeping bed 6 dry. Preferably, outer shell 28 and inner shell 29 are constructed of lightweight material such as fiberglass.

Top cover 7 is preferably constructed of flexible material, such as canvas, but may be constructed of segmented rigid material. A means 8 for anchoring and storing top cover 7 is connected to the first end 9 of top cover 7. As shown in FIGS. 5 and 6, means 8 preferably comprises a roller assembly 37 including a roller 38 having ends 39 rotatably mounted on primary frame member 2. As shown in FIG. 5, first end 9 of top cover 7 may be provided with a pocket 66 into which a first rod 67 fits. Roller 38 is hollow and is provided with a slot 68, allowing first end 9, including first rod 67, to be inserted into roller 38, with top cover 7 extending out through slot 68. Second end 10 of top cover 7 is removably connectable to either first movable frame member 13 or second movable frame member 14. Second end 10 is preferably anchored into a hollow anchor member 97 in a manner similar to first end 9. Second end 10 is provided with a pocket 58, which contains rod 88. Pocket 58, with rod 88, fits into anchor member 97, with top cover 7 extending out through slot 72. Anchor member 97 also provides a convenient means for grasping second end 10 when extending and attaching top cover 7. A means 15 is provided for attaching top cover 7 to either movable frame member 13,14. Means 15 may take any form known in the art, such as a plurality of hooks 69 which are removably attachable to either movable frame member 13,14, and which are fixedly attached to anchor member 97, as shown, or directly to second end 10 if anchor member 97 is not utilized.

Roller 38 is rotatably mounted in roller support brackets 59,62. A ratchet means 40, for prohibiting rotation of roller 38 in one direction, is fixedly attached to primary frame member 2 and operatively attached to roller 38. Ratchet means 40 may include any ratchet assembly known in the art such as toothed ratchet gear 60 (which is fixedly attached to roller 38), and ratchet stop 61 (which is pivotally connected to roller support bracket 62). Ratchet stop 61 is held in place by ratchet spring 63. Ratchet release cam 64, which is pivotally mounted on roller support bracket 62, allows the ratchet means 40 to be released by pulling ratchet release handle 65. Crank 41 is removably attachable to roller 38, enabling the user to tighten top cover 7 using ratchet means 40 for a smooth, tight fit.

First support means 11 and second support means 12 are provided for partially supporting bed cover assembly 1. Means 11 and 12 may take any form known in the art, such as first rail 31 and second rail 34. First rail longitudinal flange 32 is provided with adjustment holes 33, and second rail longitudinal flange 35 is provided with adjustment holes 36, which are aligned directly across bed 6 from adjustment holes 33. First and second rails 31,34 are secured to sidewalls 5 by rail bolts 70 or other suitable means.

Figure 7:
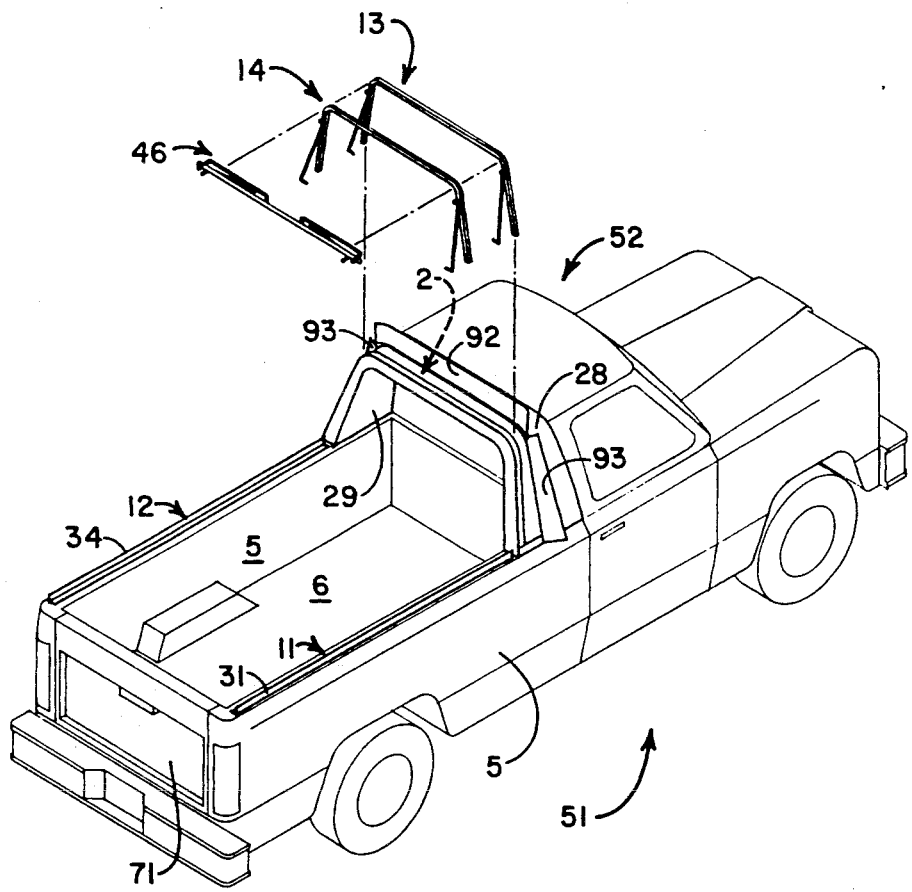
FIG. 7 is a perspective view of the storage mode of the invention.
Figure 8:
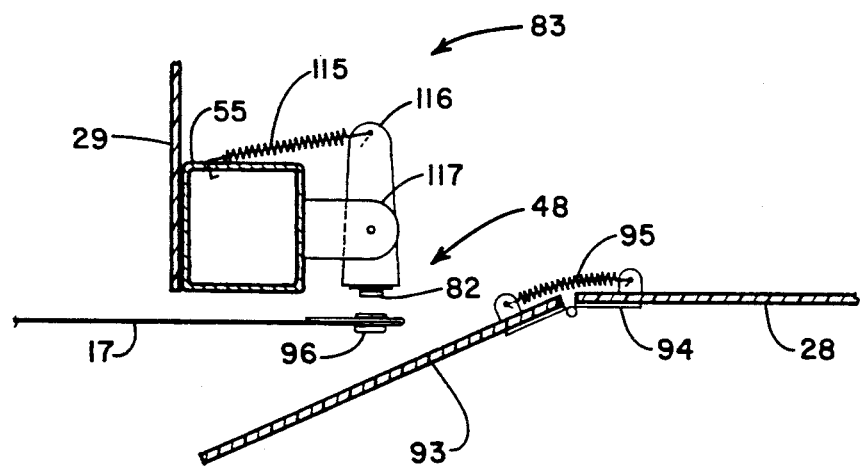
FIG. 8 is a sectional view taken along view line 8 of FIG. 6.
Figure 9:
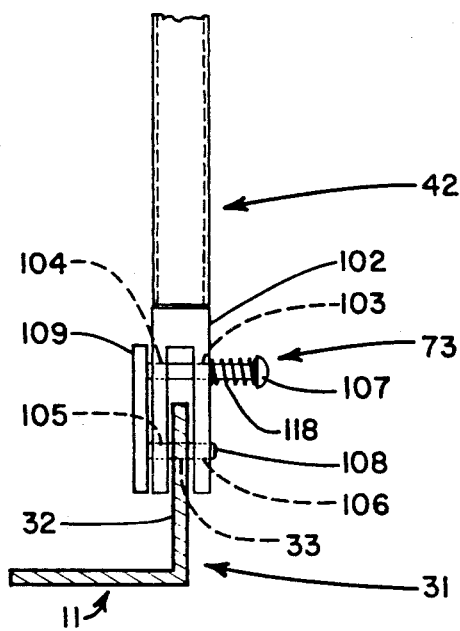
FIG. 9 is a sectional view taken along view line 9 of FIG. 6.
Figure 10:
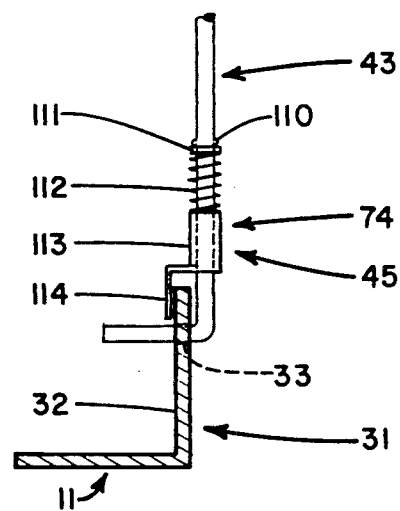
FIG. 10 is a sectional view taken along view line 10 of FIG. 6.

First movable frame member 13 and second movable frame member 14 are removably attachable to means 11 and 12, respectively. Each movable frame member 13,14 includes main frame 42 and two braces 43. Main frame 42, generally follows the same exterior contour of primary frame member 2, and is removably and pivotally attachable to any two opposite adjustment holes 33,36 in first and second rails 31,34. Attachment may be accomplished by any means known in the art, such as pin assembly 73, which secures a pinned attachment through adjustment holes 33,36. Each pin assembly 73, as shown in FIG. 7, includes a forked bracket 102, which is fixedly attached to main frame 42. Forked bracket 102 is provided with holes 103-106. Plate 109 is provided with pins 107 and 108. First pin 107 extends through holes 103 and 104, and is biased by spring 118. When main frame 42 is in place, second pin 108 extends through holes 105 and 106, as well as adjustment hole 33. Removal is accomplished by simply pressing first pin 107 inward. First ends 44 of braces 43 are pivotally attached to main frame 42 (at brace connection 119 using pins 120) and second ends 45 are removably attachable to opposite adjustment holes 33,36 in first and second rails 31,34, as shown. Preferably, second ends 45 are secured when in place within adjustment holes 33,36 by retainer assembly 74 or the like. Retainer assembly 74 is shown in FIG. 10, and includes a sleeve 113 having a retainer flange 114, slidably mounted on second end 45. The assembly 74 is held in place and biased toward rail 31 by spring 112, which is held in place by washer 111 and a stop, such as crimps 110. Second movable frame member 14 is provided with tailgate connectors 75 for optional installation of tailgate assembly 27. As can be seen any number of movable frame members 13,14 can be supplied to conveniently support a bed cover assembly 1 for partial or total coverage of any length of bed 6.

Side panels 16 are removably attachable to the bed cover assembly 1 in a variety of ways. Of course, if no side panels 16 are desirable, they need not be attached. Preferably, side panels are constructed of a flexible material, such as canvas, such that they may be rolled or folded for convenient storage in vehicle 51, such as behind the driver's seat. Windows 76, again preferably constructed of flexible material such as plastic, may be provided in side panels 16. Side panels 16 may be attached to and between top cover 7 and rails 31,34 by means of snap members 100,101 and 77,98. As shown, it is preferable that top cover 7 overlap side panels 16 to prevent leakage. Other attachment means may be utilized, such as Velcro ® or zippers. A means 49 is provided for maintaining tension between top 18 and bottom 19 of each forward side panel 17. Means 50 is provided for maintaining tension between top 23 and bottom 24 of each rear side panel 22. Means 49 and 50 can comprise any means known in the art to maintain side panel tension, such as top pocket 78, tension rod 79 and adjustment flanges 80. Top pocket 78 contains a tension rod 79. Adjustment flanges 80 having notches 81 are attached to primary frame member 2 and movable frame members 13,14 as shown in the figures, allowing variable placement of tension rods 79 to assure tension.

Thus, each rear side panel 22 may be installed by snapping the bottom 24 into place along rails 31,34 (utilizing snap members 77,98) and then attaching the top 23 by slipping tension rods 79 into place within adjustment flanges 80 on first movable frame member 13 and second movable frame member 14. Then top cover 7 can be snapped into place (utilizing snap members 100,101), overlapping the top 23 of rear side panel 22 for watertightness. Forward side panels 17 may be installed in a similar manner with bottoms 19 snapped to rails 31,34 and tops 18 held in place between adjustment flanges 80 on primary frame member 2 and first movable frame member 13. Snap members 96 on forward end 20 of each forward side panel 17 are is connectable to means 48 for connecting forward side panels 17 to primary frame member 2 and maintaining longitudinal tension on forward side panels 17, such as tension snap members 82, connected to primary frame member 2. Each tension snap member 82 is biased by a pivotal spring connection 83 (shown in FIG. 8) so as to maintain longitudinal tension on forward side panels 17. Pivotal spring connection 83 includes pivotal member 116, which is pivotally mounted on pivotal bracket 117 and biased by spring 115. When all side panels 16 are utilized, connections are made between the forward ends 25 of rear side panels 22 and the rear ends 21 of forward side panels 17 by means of zippers 84. Zippers 89 provide connections between the rear ends 26 of rear side panels 22 and tailgate assembly 27.

Tailgate assembly 27 includes a tailgate panel 47 and tailgate frame 46, further including horizontal member 85, which is pivotally attached at its ends to vertical members 86. Vertical members 86 are removably and pivotally attachable to tailgate connectors 75 on second movable frame member 14. Tailgate braces 87 are pivotally attached to horizontal member 85 and removably and pivotally attachable to vertical members 86. Tailgate panel 47 is attachable to rear side panels 22 by zippers 89 and to second end 10 of top cover 7 by zipper 90. Tailgate panel 47 is attachable to horizontal member 85 by snap members 91 and 99.

Storage of the bed cover assembly 1 is shown in FIG. 7. Top door 92 and side doors 93 provide a means 30 for opening outer shell 28 to store movable frame members 13,14 and tailgate frame 46 on primary frame member 2 within outer shell 28. Doors 92,93 are connected to the remainder of outer shell 28 by hinges 94, which are biased in a closed position by springs 95 or other means known in the art. When the bed cover assembly 1 is fully deployed, top cover 7 extends through top door 92 (which is biased closed against top cover 7), and the forward ends 20 of forward side panels 17 extend through side doors 93 (which is biased closed against forward ends 20). In order to store the removable components of the cover assembly 1, tailgate panel 47 and side panels 16 are removed, folded and stored within the vehicle cab 52. Ratchet means 40 is then released, allowing top cover 7 to be rolled onto roller 38. Vertical members 86 of tailgate assembly 27 are removed from tailgate connectors 75 and tailgate braces 87 are disconnected from vertical members 86, allowing vertical members 86 and tailgate braces 87 to be folded down parallel to horizontal member 85. Movable frame members 13,14 are disconnected from rails 31,34, allowing braces 43 to be folded flat onto main frames 42. Doors 92 and 93 are opened and the folded tailgate frame 46 and movable frame members 13,14 are placed inside outer shell 28, resting on primary frame member 2. Doors 92,93 are then closed, leaving only outer shell 28 inner shell 29 visible.

A vehicle bed cover assembly has been disclosed herein which can partially or fully cover a vehicle bed, and which can be carried within the vehicle when disassembled. Other embodiments of the invention will occur to those skilled in the art, and are intended to be included within the scope and spirit of the following claims.

I claim:

1. A vehicle bed cover assembly, comprising:
   a. a primary frame member having an exterior side and an interior side, fixedly connectable between the sidewalls of a vehicle bed, said frame member extending to a desired height above said sidewalls;
   b. a means for anchoring and storing a top cover, mounted on said primary frame member;
   c. a flexible top cover having a first end and a second end, said first end being connected to said means for anchoring and storing a top cover;
   d. a first rail fixedly attachable one said sidewall of said vehicle bed, said first rail having a longitudinal flange extending upward from said sidewall, said flange having a plurality of adjustment holes therein spaced longitudinally along said flange;
   e. a second rail fixedly attachable to the vehicle bed sidewall opposite said first rail, said second rail having a longitudinal flange extending upward from said sidewall, said flange having a plurality of adjustment holes therein spaced longitudinally along said flange;
   f. at least one movable frame member, removably connectable to said first and second rails in a fixed position between said sidewalls of said vehicle bed and extending to a desired height above said sidewalls, said movable frame member including;
      i. a main frame having two support ends, one said support end being removably and pivotally attachable to one said adjustment hole in said first rail and the other said support end being removably and pivotally attachable to one said adjustment hole in said second rail; and
      ii. a plurality of braces, each said brace having a first end pivotally attached to said main frame and a second end removably and pivotally attachable to one said adjustment hole of one said rail; and
   g. a means for attaching said flexible top cover to said movable frame member, fixedly connected to said second end of said top cover and removably connectable to said movable frame member.

2. A vehicle bed cover assembly according to claim 1, further comprising:
   f. a plurality of said panels, removably connectable to said top cover and said first rail of said second rail.

3. A vehicle bed cover assembly according to claim 1, further comprising:
   f. a plurality of forward side panels, each said forward side panel having a top, a bottom, a forward end and a rear end, said top being removably connectable to and between said primary frame member and said movable frame member and said bottom being removably connectable to said first rail or said second rail.

4. A vehicle bed cover assembly according to claim 3, wherein said bed cover assembly includes a plurality of said movable frame members, and said bed cover assembly further comprises:
   g. a plurality of rear side panels, each said rear side panel having a top, a bottom, a forward end and a rear end, said top being removably connectable to and between two said movable frame members and said bottom being removably connectable to said first rail or said second rail.

5. A vehicle bed cover assembly according to claim 2, further comprising:
   g. a tailgate assembly, substantially conforming to the shape of and removably attachable to one said movable frame member.

6. A vehicle bed cover assembly according to claim 1, further comprising:
   h. an outer shell, fixedly attached to said primary frame member and covering said exterior side of said primary frame member.

7. A vehicle bed cover assembly according to claim 6, further comprising:
   i. an inner shell, fixedly attached to said primary frame member and covering said interior side of said primary frame member.

8. A vehicle bed cover assembly according to claim 6, further comprising:
   i. a means, attached to said outer shell, for opening said outer shell to store said movable frame member within said outer shell.

9. A vehicle bed cover assembly according to claim 7, further comprising:
   j. a means, attached to said outer shell, for opening said outer shell to store said movable frame member within said outer shell.

10. A vehicle bed cover assembly according to claim 1, wherein said means for anchoring and storing a top cover a roller assembly, rotatably attached to said primary frame member and fixedly attached to said first end of said top cover.

11. A vehicle bed cover assembly according to claim 10, wherein said roller assembly includes:
   i. a roller having ends, said ends being rotatably attached to said primary frame member; and
   ii. a ratchet means, for prohibiting rotation of said roller in one direction, fixedly attached to said primary frame member and operatively attached to said roller.

12. A vehicle bed cover assembly according to claim 11, wherein said roller assembly further includes a crank, removably attachable to said ratchet means.

13. A vehicle bed cover assembly according to claim 5, wherein said tailgate assembly includes:
   i. a tailgate frame, removably and pivotally attachable to said movable frame member; and
   ii. a tailgate panel, attached to and covering said tailgate frame.

14. A vehicle bed cover assembly according to claim 3, wherein said forward end of each said forward side panel is removably connectable to said primary frame member.

15. A vehicle bed cover assembly according to claim 4, wherein said forward end of each said forward side panel is removably connectable to said primary frame member and wherein said rear end of each said forward side panel is removably connectable to said forward end of an adjacent said rear side panel.

16. A vehicle bed cover assembly according to claim 14, further comprising:
   g. a plurality of means, for connecting said forward side panels to said primary frame member and maintaining longitudinal tension on said forward side panels, attached to said primary frame member and attachable to said forward side panels.

17. A vehicle bed cover assembly according to claim 3, further comprising a plurality of means, connected to said top of each said forward side panel, for maintaining tension between said top and said bottom of each said forward side panel.

18. A vehicle bed cover assembly according to claim 4, further comprising a plurality of means, connected to said top of each said forward side panel, for maintaining tension between said top and said bottom of each said forward side panel, and a plurality of means, connected to said top of each said rear side panel, for maintaining tension between said top and said bottom of each said rear side panel.

19. A vehicle bed cover assembly according to claim 2, further comprising a plurality of means, connected to a top of each said side panel, for maintaining tension between said top and a bottom of each said side panel.

20. A vehicle bed cover assembly, comprising:
   a. a primary frame member having an exterior side and an interior side, fixedly connectable between the sidewalls of a vehicle bed, said frame member extending to a desired height above said sidewalls;
   b. a flexible top cover having a first end and a second end;
   c. a means for anchoring and storing said top cover, mounted on said primary frame member, said means for anchoring and storing said top cover including a roller assembly, rotatably attached to said primary frame ;member and fixedly attached to said first end of said top cover;
   d. a first support means for partially supporting said bed cover assembly, fixedly connected to one said sidewall;
   e. a second support means for partially supporting said bed cover assembly, fixedly connected to one said sidewall opposite said first support means;
   f. at least one movable frame member, removably connectable to said first and second support means in a fixed position between said sidewalls of said vehicle bed and extending to a desired height above said sidewalls;
   g. a means for attaching said flexible top cover to said movable frame member, fixedly connected to said second end of said top cover and removably connectable to said movable frame member;
   h. an outer shell, fixedly attached to said primary frame member and covering said exterior side of said primary frame member; and
   i. a means, attached to said outer shell, for opening said outer shell to store said movable frame member within said outer shell.

* * * * *